United States Patent
Park

(10) Patent No.: US 12,327,346 B2
(45) Date of Patent: Jun. 10, 2025

(54) AUTOMATIC TWO-COMPONENT TYPE RESIN INSPECTION DEVICE, AUTOMATIC TWO-COMPONENT TYPE RESIN INSPECTION SYSTEM COMPRISING SAME, AND AUTOMATIC TWO-COMPONENT TYPE RESIN INSPECTION METHOD

(71) Applicant: LG ENERGY SOLUTION, LTD., Seoul (KR)

(72) Inventor: Hyoung Bae Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/036,077

(22) PCT Filed: Sep. 5, 2022

(86) PCT No.: PCT/KR2022/013238
§ 371 (c)(1),
(2) Date: May 9, 2023

(87) PCT Pub. No.: WO2023/043104
PCT Pub. Date: Mar. 23, 2023

(65) Prior Publication Data
US 2023/0394643 A1    Dec. 7, 2023

(30) Foreign Application Priority Data

Sep. 14, 2021 (KR) .................. 10-2021-0122600
Sep. 2, 2022 (KR) .................. 10-2022-0111370

(51) Int. Cl.
*G06T 7/00* (2017.01)
*G01N 21/27* (2006.01)
(Continued)

(52) U.S. Cl.
CPC .......... *G06T 7/0004* (2013.01); *G01N 21/272* (2013.01); *G06T 7/90* (2017.01); *H04N 23/56* (2023.01)

(58) Field of Classification Search
CPC .......... G06T 7/0004; G06T 7/90; H04N 23/56; G01N 21/272
See application file for complete search history.

(56) References Cited

U.S. PATENT DOCUMENTS 5,339,963 A     8/1994  Tao
2006/0000975 A1  1/2006  Minamiura et al.
(Continued)

FOREIGN PATENT DOCUMENTS

CN  106367013 A  *  2/2017
CN  106450473 A      2/2017
(Continued)

OTHER PUBLICATIONS

Japanese Office Action for Japanese Application No. 2023-528327, dated Mar. 25, 2024, with English translation.
(Continued)

*Primary Examiner* — Girumsew Wendmagegn
(74) *Attorney, Agent, or Firm* — Birch, Stewart, Kolasch & Birch, LLP

(57) ABSTRACT

An automatic two-component resin inspection device for automatically determining in real time whether a two-component resin injected into a battery module is normal, an automatic two-component resin inspection system including the same, and an automatic two-component resin inspection method are provided. The automatic two-component resin inspection device includes a housing with an open lower part, a lighting unit configured to emit light toward the open lower part of the housing, a camera unit configured to obtain a resin image by photographing a two-component resin (Continued)

injected into a battery module under the open lower part of the housing, and a determiner configured to determine whether the two-component resin injected into the battery module is normal on the basis of color information of the resin image obtained by the camera unit.

11 Claims, 5 Drawing Sheets

(51) Int. Cl.
*G06T 7/90* (2017.01)
*H04N 23/56* (2023.01)

(56) References Cited

U.S. PATENT DOCUMENTS

| | | |
|---|---|---|
| 2017/0261310 A1 | 9/2017 | Eun et al. |
| 2020/0055078 A1 | 2/2020 | Minichev et al. |
| 2022/0247046 A1 | 8/2022 | Lee et al. |
| 2022/0328899 A1 | 10/2022 | You et al. |

FOREIGN PATENT DOCUMENTS

| | | | |
|---|---|---|---|
| JP | 3-97775 A | | 4/1991 |
| JP | 2002-139452 A | | 5/2002 |
| JP | 2003-216930 A | | 7/2003 |
| JP | 2011-62882 A | | 3/2011 |
| JP | 2015183173 A | * | 10/2015 |
| JP | 2017-63279 A | | 5/2017 |
| JP | 6292050 B2 | | 3/2018 |
| JP | 2018-189420 A | | 11/2018 |
| KR | 10-0866743 B1 | | 11/2008 |
| KR | 10-1046106 B1 | | 7/2011 |
| KR | 10-1496936 B1 | | 3/2015 |
| KR | 10-2016-0026068 A | | 3/2016 |
| KR | 10-2017-0106587 A | | 9/2017 |
| KR | 10-2018-0085424 A | | 7/2018 |
| KR | 10-2020-0010932 A | | 1/2020 |
| KR | 102174950 B1 | * | 11/2020 |
| KR | 10-2021-0060865 A | | 5/2021 |
| KR | 10-2021-0063940 A | | 6/2021 |
| WO | WO 2013/102858 A1 | | 7/2013 |
| WO | WO 2020/197309 A1 | | 10/2020 |

OTHER PUBLICATIONS

International Search Report (PCT/ISA/210) Issued in PCT/KR2022/013238 mailed on Dec. 12. 2022.
Extended European Search Report for European Application No. 22870189.2, dated May 14, 2024.

* cited by examiner

FIG. 1        Related Art
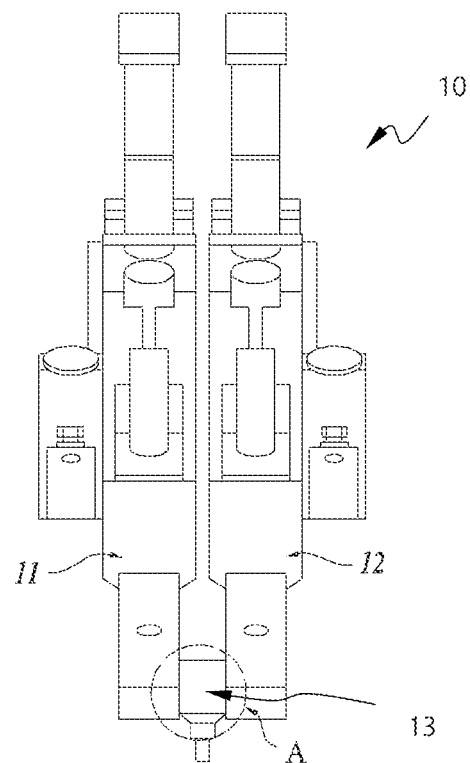
FIG.2        Related Art
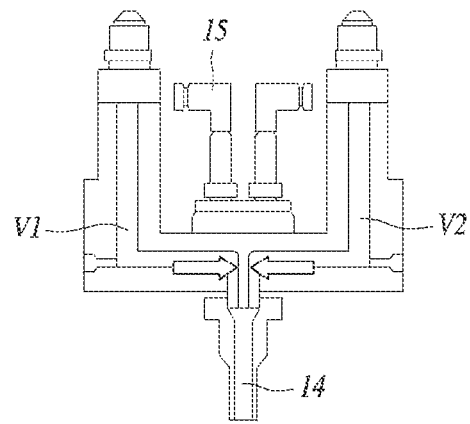

AUTOMATIC TWO-COMPONENT TYPE RESIN INSPECTION DEVICE, AUTOMATIC TWO-COMPONENT TYPE RESIN INSPECTION SYSTEM COMPRISING SAME, AND AUTOMATIC TWO-COMPONENT TYPE RESIN INSPECTION METHOD

TECHNICAL FIELD

This application claims the benefit of priority based on Korean Patent Application No. 10-2021-0122600, filed on Sep. 14, 2021 and Korean Patent Application No. 10-2022-0111370, filed on Sep. 2, 2022, and the entire contents of the Korean patent applications are incorporated herein by reference.

The present invention relates to an automatic two-component resin inspection device, an automatic two-component resin inspection system including the same, and an automatic two-component resin inspection method.

BACKGROUND ART

Currently commercialized secondary batteries include nickel cadmium batteries, nickel hydrogen batteries, nickel zinc batteries, lithium secondary batteries, etc., and among the second batteries, lithium secondary batteries hardly cause a memory effect compared to nickel secondary batteries and thus have drawn attention owing to their free charging and discharging capability, very low self-discharge rate, and high energy density.

Generally, such a lithium secondary battery uses a lithium-based oxide as a positive electrode active material and a carbon material as a negative electrode active material. The lithium secondary battery includes an electrode assembly in which a positive electrode plate coated with the positive electrode active material and a negative electrode plate coated with the negative electrode active material are disposed with a separator interposed therebetween, and a cladding material for sealing the electrode assembly together with an electrolyte, and may be classified as a can type secondary battery or a pouch type secondary battery according to a shape of the cladding material. Such a single secondary battery may be referred to as a battery cell.

Recently, secondary batteries have been widely used in not only small sized devices such as portable electronic devices but also medium and large sized devices such as vehicles and power storage devices. When a second battery is used in such a medium sized device, a battery module in which a large number of battery cells are electrically connected to each other or a battery pack in which such battery modules are connected to each other may be used to increase a capacity and an output.

In one method of configuring this type of battery module or battery pack, an adhesive material (a resin or a resin composition) is used to fix a plurality of battery cells inside a battery module. In this case, the adhesive material may be injected into the battery module through an injection hole formed in a surface of the battery module.

Specifically, the adhesive material may be a two-component resin including a main resin, a curing agent, etc., and the two-component resin filling the battery module as described above may appropriately absorb heat generated inside batteries, thus preventing a sharp change of temperature of the batteries and allowing a heat to be discharged to the outside. To discharge heat using the two-component resin and cure the two-component resin, a mixed state of the main resin and the curing agent constituting the two-component resin is important.

A resin injection device for injecting the two-component resin into a battery module will be described with reference to FIGS. 1 and 2. FIG. 1 is a front view of a resin injection device of the related art, and FIG. 2 is an enlarged view of the inside of a part A of FIG. 1.

Referring to FIGS. 1 and 2, a resin injection device 10 includes a main-resin supply 11, a curing agent supply 12, a mixing unit 13, an injector 14, and a pressure sensor 15.

The main-resin supply 11 supplies a main resin to the mixing unit 13, and the curing agent supply 12 supplies a curing agent to the mixing unit 13. The main-resin supply 11 and the curing agent supply 12 supply the main resin and the curing agent to the mixing unit 13 through individual valves V1 and V2, respectively.

The mixing unit 13 includes a mixer, and mixes the main resin and the curing agent supplied through the main-resin supply 11 and the curing agent supply 12 to obtain a two-component resin. The injector 14 injects the two-component resin into a battery module.

The pressure sensor 15 measures a pressure value in a valve generated during the supply of the main resin and the curing agent. Whether the two-component resin is normal or defective is checked on the basis of the measured pressure value during the mixing of the main resin and the curing agent. Thereafter, when the two-component resin is cured, an operator may check the color of the two-component resin with the naked eye to check whether the two-component resin is normal or defective.

The related art described above is disadvantageous in that when a measured pressure value is inaccurate due to the contamination/failure of the pressure sensor 15, this problem cannot be handled quickly. In addition, there is always a possibility that when the operator manually checks the color of the two-component resin with the naked eye, the operator will misjudge the color according to a work environment such as a long-term inspection or poor lighting.

DISCLOSURE

Technical Problem

The present invention is directed to providing an automatic two-component resin inspection device for automatically determining in real time whether a two-component resin injected into a battery module is normal, an automatic two-component resin inspection system including the same, and an automatic two-component resin inspection method.

Technical Solution

An automatic two-component resin inspection device according to an embodiment of the present invention includes a housing having an open lower part, a lighting unit configured to emit light toward the open lower part of the housing, a camera unit configured to obtain a resin image of a two-component resin injected into a battery module when the battery module is located under the open lower part of the housing, and a determiner configured to determine whether the two-component resin injected into the battery module is normal on the basis of color information of the resin image obtained by the camera unit.

In an embodiment of the present invention, the automatic two-component resin inspection device may further include a database unit storing color information according to a mixing ratio of a two-component resin.

In an embodiment of the present invention, in the automatic two-component resin inspection device, the lighting unit may include a plurality of light-emitting diodes (LEDs), and the plurality of LEDs may be uniformly located on opposite sides of an upper surface of the housing.

In an embodiment of the present invention, in the automatic two-component resin inspection device, the camera unit may be a machine vision camera, and the determiner may be an image processor included in the machine vision camera.

An automatic two-component resin inspection system according to an embodiment of the present invention includes a resin injection device configured to inject a two-component resin into a battery module, and an automatic two-component resin inspection device located downstream from the resin injection device, the automatic two-component resin inspection device being configured to obtain a resin image of the two-component resin injected into the battery module and to determine whether the two-component resin injected into the battery module is normal on the basis of color information of the resin image.

In an embodiment of the present invention, in the automatic two-component resin inspection system, the automatic two-component resin inspection device may include a housing having an open lower part, a lighting unit configured to emit light toward the open lower part of the housing, a camera unit configured to obtain the resin image of the two-component resin injected into the battery module when the battery module is located under the open lower part of the housing, and a determiner configured to determine whether the two-component resin injected into the battery module is normal on the basis of color information of the resin image obtained by the camera unit.

In an embodiment of the present invention, in the automatic two-component resin inspection system, the resin injection device may include a pressure sensor configured to measure a pressure value in a valve during supply of a main resin and a curing agent of the two-component resin and the determiner may be configured to determine that a mixed state of the two-component resin is normal when a result of determining whether the two-component resin is normal on the basis of the pressure value matches a result of determining whether the two-component resin is normal on the basis of the color information of the resin.

In an embodiment of the present invention, in the automatic two-component resin inspection system, the resin injection device may include a pressure sensor configured to measure a pressure value in a valve during supply of a main resin and a curing agent of the two-component resin, and the determiner may be configured to determine that at least one of the pressure sensor, the lighting unit, or the camera unit is abnormal and to generate alarm information when a result of determining whether the two-component resin is normal on the basis of the pressure value does not match a result of determining whether the two-component resin is normal on the basis of the color information of the resin.

An automatic two-component resin inspection method according to an embodiment of the present invention includes injecting a two-component resin prepared by mixing a main resin and a curing agent into a battery module by a resin injection device, obtaining a resin image of the two-component resin injected into the battery module by a camera unit, and determining, by a determiner, whether the two-component resin injected into the battery module is normal on the basis of color information of the resin image.

In an embodiment of the present invention, in the automatic two-component resin inspection method, the determining of whether the two-component resin injected into the battery module is normal may include generating alarm information when a result of determining whether the two-component resin is normal on the basis of the pressure value does not match a result of determining whether the two-component resin is normal on the basis of the color information of the resin.

Details of other embodiments according to various aspects of the present invention are provided in the following detailed description.

Advantageous Effects

According to an embodiment of the present invention, whether a two-component resin injected into a battery module is normal or not can be automatically determined immediately after the injection of the two-component resin, thereby avoiding a mass-scale defect.

BRIEF DESCRIPTION OF THE DRAWINGS

FIG. 1 is a front view of a resin injection device of the related art.

FIG. 2 is an enlarged view of the inside of a part A of FIG. 1.

DETAILED DESCRIPTION OF THE PREFERRED EMBODIMENTS

The present invention may be embodied in many different forms and implemented in various embodiments. Thus, certain embodiments are illustrated in the accompanying drawings and described in detail herein. However, it should be understood that the present invention is not limited to particular embodiments and includes all modifications, equivalents, and alternatives falling within the idea and scope of the present invention.

The terms used herein are only used to describe certain embodiments and are not intended to limit the present invention. As used herein, the singular expressions are intended to include plural forms as well, unless the context clearly dictates otherwise. It should be understood that the terms "comprise" and/or "comprising," when used herein, specify the presence of stated features, integers, steps, operations, elements, components, or a combination thereof, but do not preclude the presence or addition of one or more features, integers, steps, operations, elements, components, or a combination thereof. Hereinafter, an automatic two-component resin inspection device, an automatic two-component resin inspection system including the same, and an automatic two-component resin inspection method according to embodiments of the present invention will be described with reference to the accompanying drawings.

Figure 3:
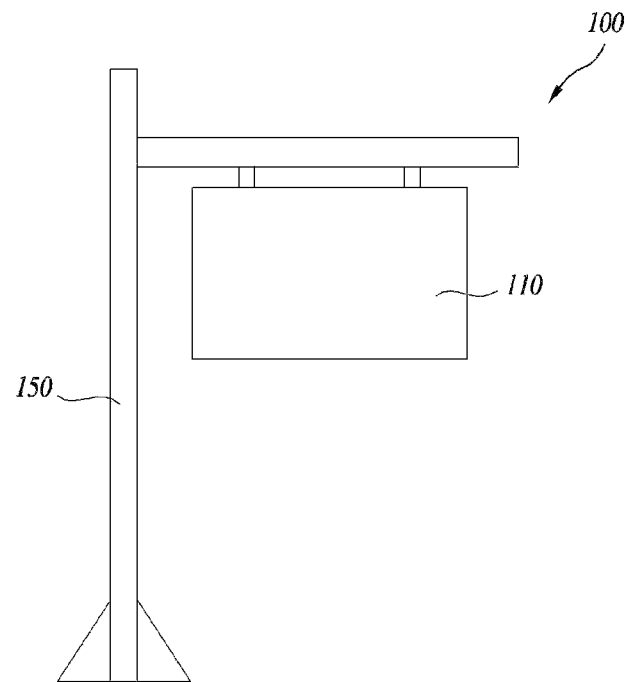
FIG. 3 is an elevation view of an automatic two-component resin inspection device according to an embodiment of the present invention.
Figure 4:
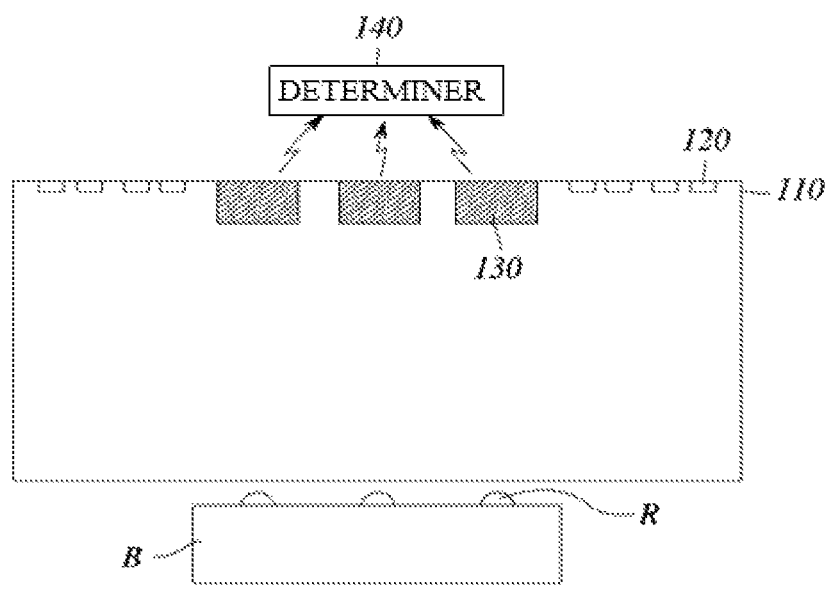
FIG. 4 is a view of the inside of a housing of an automatic two-component resin inspection device according to an embodiment of the present invention.
Figure 5:
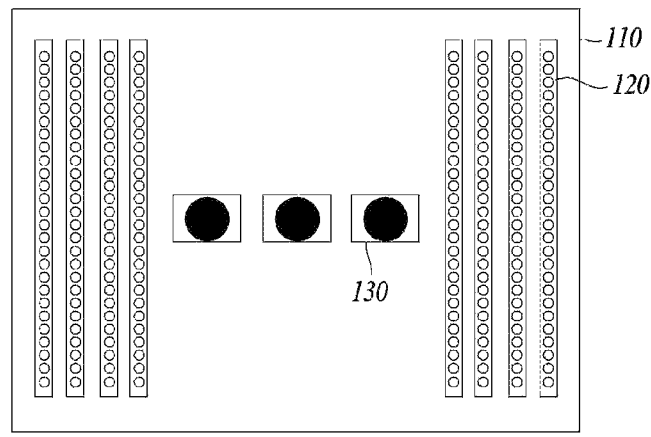
FIG. 5 is a bottom view of an automatic two-component resin inspection device according to an embodiment of the present invention.

FIG. 3 is an elevation view of an automatic two-component resin inspection device according to an embodiment of the present invention. FIG. 4 is a view of the inside of a housing of an automatic two-component resin inspection device according to an embodiment of the present invention. FIG. 5 is a bottom view of an automatic two-component resin inspection device according to an embodiment of the present invention.

As shown in FIGS. 3 to 5, an automatic two-component resin inspection device 100 according to the embodiment of the present invention includes a housing 110, a lighting unit 120, a camera unit 130, and a determiner 140. Optionally, the automatic two-component resin inspection device 100 may further include a support 150.

The housing 110 blocks external light so that the brightness of light emitted from the lighting unit 120 may be maintained constant. The housing 110 may have one of various shapes such as a polyhedral shape and a cylindrical shape. An example in which the housing 110 has a rectangular parallelepiped shape is illustrated in the drawings. A lower part of the housing 110 is open so that the lighting unit 120 may emit light having certain brightness to a battery module B under the housing 110 and the camera unit 130 may photograph a two-component resin R injected into the battery module B. The two-component resin R has been injected into the battery module B by a resin injection device provided in front of the automatic two-component resin inspection device 100. The housing 110 may be supported at a certain height by the support 150 according to a selection depending on a workplace facility situation.

The lighting unit 120 emits light toward the open lower part of the housing 110. When light of certain brightness can be emitted toward the lower part of the housing 110, an installation position of the lighting unit 120 is not limited, but as illustrated in FIGS. 4 and 5, a plurality of light-emitting diodes (LEDs) are preferably installed uniformly below both sides of an upper surface of the housing 110. A type of the lighting unit 120 is not limited as long as it can emit light and is not limited to the LEDs.

The camera unit 130 obtains a resin image by photographing the two-component resin R injected into the battery module B. An installation position of and the number of camera units 130 are not limited, but as illustrated in FIGS. 4 and 5, the camera unit 130 may be installed between lighting units 120. The battery module B may be positioned under the open lower part of the housing 110 by being moved by a moving unit (e.g., a conveyor belt) installed between a resin injection device in front of the automatic two-component resin inspection device 100 and the automatic two-component resin inspection device 100. The resin image obtained by the camera unit 130 may be transmitted to the determiner 140.

The determiner 140 determines a mixed state of the two-component resin in real time based on color information of the resin image. For example, the color information may be specified by at least one selected from the group consisting of a hue/saturation/value (HSV) model, an RGB model, and an L*a*b* model. The HSV model specifies color information with the coordinates of hue, saturation, and a value (brightness value), and allows a gradient of color to gradually change, compared to the RGB model described below. With the HSV model, a change of shadow and a change of chroma can be easily represented by fixing two parameters and moving only one of the two parameters. The RGB model specifies color information using three colors, e.g., red, green, and blue, and the L*a*b* model specifies color information by L* (Luminosity) representing brightness, a* representing a degree to which a color is close to red or green, and b* representing a degree to which a color is close to yellow or blue.

Figure 10:
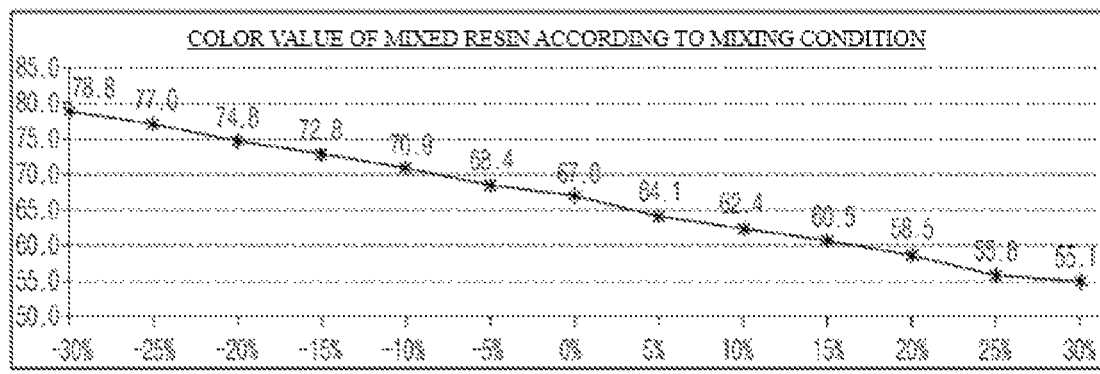
FIG. 10 is a graph showing color information according to a mixing ratio of a two-component resin according to an embodiment of the present invention.

For example, an automatic two-component resin inspection device of the present invention may further include a database unit storing color information according to a mixing ratio of a two-component resin. FIG. 10 is a graph showing color information according to a mixing ratio of a two-component resin stored in a database unit according to an embodiment of the present invention.

Referring to FIG. 10, color information may vary according to a mixing ratio between a main resin and a curing agent and thus a mixing ratio between a main resin and a curing agent may be estimated on the basis of color information of a two-component resin.

In the graph of FIG. 10, an x-axis represents mixing ratio information of the main resin and the curing agent, and a y-axis represents color information. Here, mixing ratio information of 0% denotes an optimal mixing ratio, mixing ratio information of −5% denotes that the curing agent is 5% short of the optimal mixing ratio, and mixing ratio information of 5% denotes that the curing agent is 5% over the optimal mixing ratio.

The data shown in FIG. 10 may be collected through the following process.

First, a two-component resin is prepared by mixing the main resin and the curing agent at a certain ratio and thereafter an image thereof is obtained by the camera unit 130. In addition, color information is digitized from the image by at least one method selected from the group consisting of an HSV model, an RGB model, and an L*a*b* model, and stored in a database unit.

Two-component resins are prepared by variously changing the mixing ratio, and the above-described process is repeatedly performed on two-component resins prepared at various mixing ratios. In this case, in order to increase reliability, a large number of samples may be prepared for a mixing ratio, and an average of or an intermediate value of color information of the samples may be set as a representative value and be stored in the database unit. In this case, the number of the samples may be in the range of 2 to 50 or 5 to 50.

For example, the determiner 140 stores a range of color information (hereinafter referred to as a normal range) extracted from a resin image of a two-component resin that is in a normal state, extracts color information from a resin image transmitted from the camera unit 130, and determines that a mixed state is normal when the extracted color information falls within the stored normal range. When the extracted color information does not fall within the stored normal range, it is determined that the mixed state is poor. The normal range may be statistically determined from images of a large number of non-defective two-component resins. For example, referring to the database of FIG. 10, the determiner may determine that a target two-component resin is normal when color information extracted from an image of the target two-component resin falls within a color information range of ±5% (68.4 or 64.1).

As another example, it may be determined that urethane resin is normal when it falls within a range of 120 to 150 on the basis of brightness corresponding to L* of color coordinates and is defective when it does not fall within that range.

Meanwhile, when the camera unit 130 is configured as a machine vision camera, the determiner 140 may be configured as an image processor, software, or the like implemented in the machine vision camera. The machine vision camera includes a high-performance camera, an image processor, software, or the like, and after an image is obtained, the image processor or the software processes and analyzes the image according to a purpose of a certain task and provides a judgment for performing the task.

For example, the two-component resin may be a room-temperature curable resin. The room-temperature curable resin is a composition with a system that exhibits a certain level of adhesive capability through a curing reaction at room temperature, and may be, for example, a two-component resin containing a main resin and a curing agent. Silicon resin, polyol resin, epoxy resin, or acrylic resin may be used as the main resin. Meanwhile, a well-known curing agent suitable for the main resin may be used as the curing agent. For example, a siloxane compound may be used as the curing agent when the main resin is silicone resin, an isocyanate compound may be used as the curing agent when the main resin is polyol resin, an amine compound may be used as the curing agent when the main resin is epoxy resin, and an isocyanate compound may be used as the curing agent when the main resin is acrylic resin.

For example, the two-component resin may be a two-component urethane composition. When the two-component urethane composition is used, it may contain components described below. A main resin containing polyol or the like and a curing agent containing isocyanate or the like may react and be cured together at room temperature. The curing reaction may be accelerated with the help of a catalyst such as dibutyltin dilaurate (DBTDL). Accordingly, the two-component urethane composition may include a physical mixture of a main resin component (polyol) and a curing agent component (isocyanate) and/or a reactant (a cured product) of the main resin component and the curing agent component.

According to the present invention, based on a fact that a color of a two-component resin varies according to a mixing ratio between a main resin component and a curing agent component, an image of a two-component resin may be obtained by the camera unit, color information may be obtained from the image, and whether the mixing ratio between the main component and the curing agent component and a mixed state thereof are poor may be determined in real time by the determiner, and the two-component resin may be inspected before curing, thereby preventing the occurrence of a large number of defects.

For example, the battery module includes a module case and a battery cell. The battery cell may be accommodated in the module case. One or more battery cells may be included in the module case or a plurality of battery cells may be accommodated in the module case. The number of battery cells accommodated in the module case is not particularly limited and may be adjusted according to usage or the like. The battery cells accommodated in the module case may be electrically connected to each other.

The module case may include at least sidewalls and a lower plate that form an inner space for accommodating battery cells. The module case may further include an upper plate for sealing the inner space. The side walls, the lower plate, and the upper plate may be integrally formed with one another. A shape and size of the module case are not particularly limited and may be appropriately selected according to usage, the shape and number of battery cells to be accommodated in the inner space, or the like.

Figure 6:
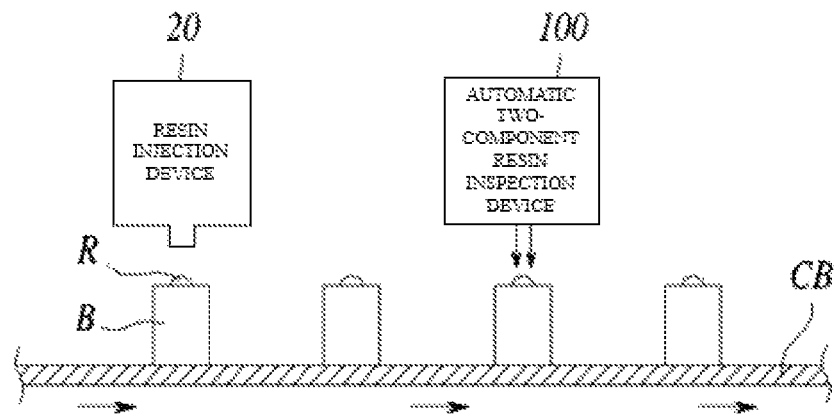
FIG. 6 is a conceptual diagram illustrating an automatic two-component resin inspection system according to an embodiment of the present invention.

Next, an automatic two-component resin inspection system according to an embodiment of the present invention will be described with reference to FIG. 6. FIG. 6 is a conceptual diagram illustrating an automatic two-component resin inspection system according to the embodiment of the present invention.

As shown in FIG. 6, the automatic two-component resin inspection system according to the embodiment of the present invention includes a resin injection device 20, an automatic two-component resin inspection device 100, and a moving unit CB.

The resin injection device 20 is substantially the same as the resin injection device 10 of the related art described with reference to FIGS. 1 and 2. However, in the present invention, the determiner 140 of the automatic two-component resin inspection device 100 determines a mixed state of a two-component resin on the basis of color information of a resin image in real time and thus the pressure sensor 15 of the resin injection device 10 of the related art may be omitted. This is because a function of the pressure sensor 15 that checks whether the mixed state is normal or defective in a mixing process is a redundant function. Accordingly, manufacturing costs of the resin injection device 20 may decrease.

The automatic two-component resin inspection device 100 is installed behind the resin injection device 20. The automatic two-component resin inspection device 100 obtains a resin image by photographing a two-component resin R injected into a battery module B and determines in real time whether the two-component resin R injected into the battery module B is defective based on color information of the resin image. The automatic two-component resin inspection device 100 has been described above with reference to FIGS. 3 to 5 and thus will not be redundantly described here.

However, when the resin injection device 20 includes the pressure sensor 15, the determiner 140 of the automatic two-component resin inspection device 100 may additionally determine whether a mixed state is normal or defective in a mixing process on the basis of a pressure value obtained by the pressure sensor 15. The determiner 140 may store a range of pressure values falling within a normal range determined by a statistical method by repeatedly conducting experiments. When an obtained pressure value falls within the normal range, the determiner 140 may determine that the mixed state is normal. When the pressure value does not fall within the normal range, it is determined that the mixed state is defective.

When a result of determining whether the mixed state is normal on the basis of the pressure value matches a result of determining whether the mixed state is normal on the basis of the color information of the resin image, the determiner 140 determines that the mixed state is normal.

When the result of determining whether the mixed state is normal on the basis of the pressure value does not match the result of determining whether the mixed state is normal on the basis of the color information of the resin image, the determiner 140 may determine that an abnormality such as contamination or a malfunction has occurred in at least one of the pressure sensor 15 of the resin injection device 20 and the lighting unit 120 and the camera unit 130 of the automatic two-component resin inspection device 100 and generate alarm information. An alarm may be issued using at least one of a visual means, an auditory means, and a tactile means. The alarm information may be generated using at least one of a visual means, an auditory means, and a tactile means. An operator who recognizes the alarm information may take necessary measures quickly.

A moving unit CB is installed between the resin injection device 20 and the automatic two-component resin inspection device 100. The moving unit CB may be, for example, a conveyor belt. Alternatively, the moving unit CB may also be installed in front of the resin injection device 20 and behind the automatic two-component resin inspection system 100 to consecutively perform pre-processing to inject a two-component resin and post-processing to inspect a two-component resin. The moving unit CB may be temporarily paused periodically and moved after a certain time period according to shooting time of the camera unit 130 of the automatic two-component resin inspection device 100.

Figure 7:
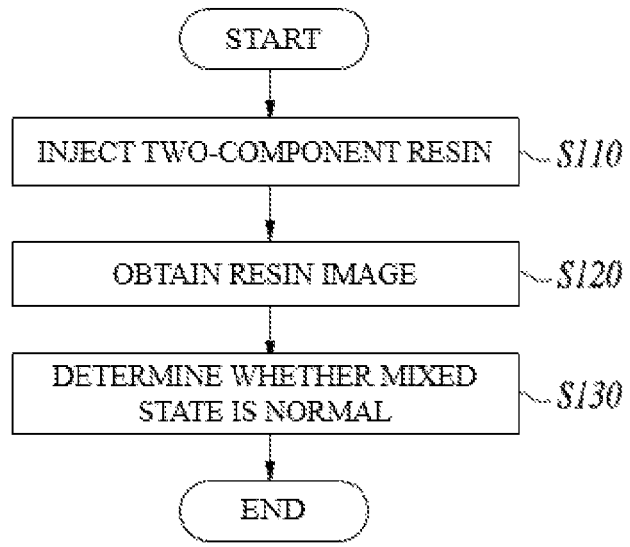
FIG. 7 is a flowchart of an automatic two-component resin inspection method according to an embodiment of the present invention.

Next, an automatic two-component resin inspection method according to an embodiment of the present invention will be described with reference to FIG. 7. FIG. 7 is a flowchart of the automatic two-component resin inspection method according to the embodiment of the present invention.

Referring to FIG. 7, the automatic two-component resin inspection method according to the embodiment of the present invention includes injecting a two-component resin (S110), obtaining a resin image (S120), and determining whether a mixed state is normal (S130).

In the injecting of the two-component resin (S110), the resin injection device 20 injects a two-component resin R prepared by mixing a main resin and a curing agent into a void (a space between cylindrical secondary batteries) of the battery module B. The battery module B into which the two-component resin R is injected is moved by a moving unit to be positioned under the open lower part of the housing 110 of the automatic two-component resin inspection device 100.

In the obtaining of the resin image (S120), the camera unit 130 of the automatic two-component resin inspection device 100 obtains a resin image by photographing the two-component resin injected into the battery module B.

In the determining of whether the mixed state is normal (S130), the determiner 140 of the automatic two-component resin inspection device 100 identifies the mixed state of the two-component resin in real time on the basis of the color information (lightness, saturation, an RGB value, etc.) of the resin image. The determiner 140 extracts color information from a resin image transmitted from the camera unit 130, and determines that the mixed state is normal when the extracted color information falls within a stored normal range.

Figure 8:
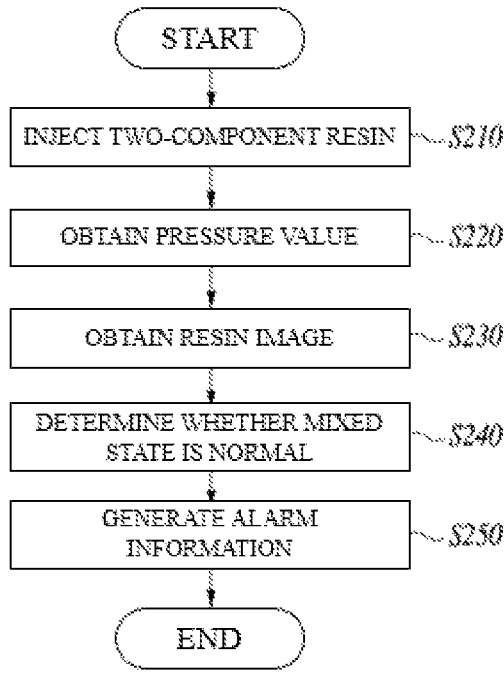
FIG. 8 is a flowchart of an automatic two-component resin inspection method according to another embodiment of the present invention.

Next, an automatic two-component resin inspection method according to another embodiment of the present invention will be described with reference to FIG. 8. FIG. 8 is a flowchart of an automatic two-component resin inspection method according to another embodiment of the present invention. The present embodiment is useful when the resin injection device 20 includes the pressure sensor 15.

Referring to FIG. 8, an automatic two-component resin inspection method according to another embodiment of the present invention includes injecting a two-component resin (S210), obtaining a pressure value (S220), obtaining a resin image (S230), determining whether a mixed state is normal (S240), and generating alarm information (S250).

In the injecting of the two-component resin (S210), the resin injection device 20 injects a two-component resin prepared by mixing a main resin and a curing agent into a void (a space between cylindrical secondary batteries) of the battery module B. The battery module B into which the two-component resin is injected is moved by a moving unit to be positioned under the open lower part of the housing 100 of the automatic two-component resin inspection device 100.

In the obtaining of the pressure value (S220), the pressure sensor 15 of the resin injection device 20 measures and obtains a pressure value in a valve generated during the supplying of the main resin and the curing agent. The measured pressure value may be transmitted to the determiner 140. In this case, the resin injection device 20 may include a communication module for transmitting the pressure value.

In the obtaining of the resin image (S230), the camera unit 130 of the automatic two-component resin inspection device 100 obtains a resin image by photographing the two-component resin injected into the battery module B.

In the determining of whether the mixed state is normal (S240), the determiner 140 of the automatic two-component resin inspection device 100 identifies the mixed state of the two-component resin in real time on the basis of the color information (lightness, saturation, an RGB value, etc.) of the resin image. The determiner 140 extracts color information from a resin image transmitted from the camera unit 130, and determines that the mixed state is normal when the extracted color information falls within a stored normal range.

Meanwhile, the determiner 140 may determine whether the mixed state is normal or defective in a mixing process on the basis of the pressure value obtained in the obtaining of the pressure value (S220). When an obtained pressure value falls within the normal range, the determiner 140 may determine that the mixed state is normal.

When a result of determining whether the mixed state is normal on the basis of the pressure value matches a result of determining whether the mixed state is normal on the basis of the color information of the resin image, the determiner 140 determines that the mixed state is normal.

When the result of determining whether the mixed state is normal on the basis of the pressure value does not match the result of determining whether the mixed state is normal on the basis of the color information of the resin image, the determiner 140 may determine that an abnormality such as contamination or a malfunction has occurred in at least one of the pressure sensor 15 of the resin injection device 20, the lighting unit 120, and the camera unit 130 of the automatic two-component resin inspection device 100 and generates alarm information (S250).

Figure 9:
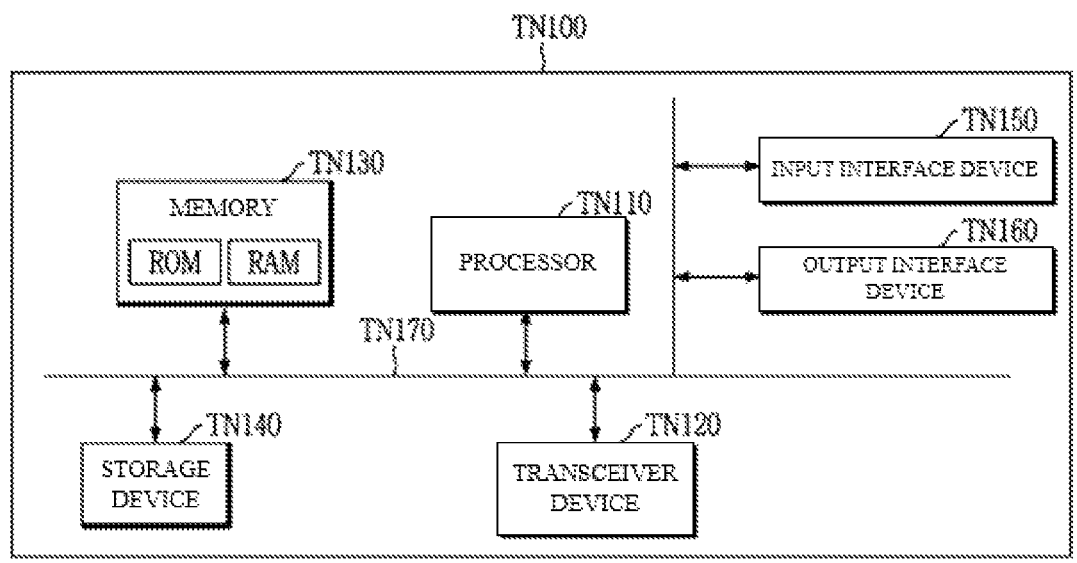
FIG. 9 is a diagram illustrating a computing device (a determiner) for performing an automatic two-component resin inspection according to an embodiment of the present invention.

FIG. 9 is a diagram illustrating a computing device for performing an automatic two-component resin inspection according to an embodiment of the present invention. A computing device TN100 of FIG. 9 may correspond to the determiner 140 described herein.

In the embodiment of FIG. 9, the computing device TN100 may include at least one processor TN110, a transceiver device TN120, and a memory TN130. The computing device TN100 may further include a storage device TN140, an input interface device TN150, an output interface device TN160, and the like. The components of the computing device TN100 may be connected to one another by a bus TN170 to communicate with one another.

The processor TN110 may execute a program command stored in at least one of the memory TN130 and the storage device TN140. The processor TN110 may be a central processing unit (CPU), a graphics processing unit (GPU), or a dedicated processor configured to perform methods according to embodiments of the present invention. The processor TN110 may be configured to implement procedures, functions, methods, etc. described above in relation to embodiments of the present invention. The processor TN110 may control the components of the computing device TN100.

The memory TN130 and the storage device TN140 may each include various types of information related to operations of the processor TN110. Each of the memory TN130 and the storage device TN140 may be configured as at least one of a volatile storage medium and a nonvolatile storage medium. For example, the memory TN130 may be configured as at least one of a read-only memory (ROM) and a random access memory (RAM).

The transceiver device TN120 may transmit or receive a wired signal or a wireless signal. The transceiver device TN120 may be connected to a network to perform communication.

Meanwhile, the present invention may be implemented as a computer program. The present invention can be combined with hardware to be implemented as a computer program stored in a computer-readable recording medium.

Methods according to embodiments of the present invention may be embodied in the form of a program executable through various computer means and recorded on a computer-readable recording medium. Here, the recording medium may include program instructions, data files, data structures, etc. solely or in combination.

The program instructions recorded on the recording medium may be specially designed and configured for the present invention or may be well known and available to those of ordinary skill in the field of computer software.

Examples of the recording medium include magnetic media such as hard disks, floppy disks, and magnetic tapes, optical media such as CD-ROMs and DVDs, magneto-optical media such as floptical disks, and hardware devices, such as ROMs, RAMs, and flash memories, which are specifically configured to store and execute program instructions.

Examples of the program instructions include not only a machine language created by a compiler but also a high-level language executable by a computer using an interpreter or the like.

Such a hardware device as described above may be configured to operate as one or more software modules to perform operations of the present invention and vice versa.

Although embodiments of the present invention have been described above, various modifications and changes may be made in the present invention by adding, changing or deleting components by those of ordinary skill in the art without departing from the scope of the present invention defined in the appended claims and such modifications and changes fall within the scope of the present invention.

REFERENCE NUMERALS

| 10, 20: resin injection device | 100: automatic two-component resin inspection device |
|---|---|
| 110: housing | 120: lighting unit |
| 130: camera unit | 140: determiner |
| B: battery module | R: two-component resin |

The invention claimed is:

1. An automatic two-component resin inspection device comprising:
   a housing having an open lower part;
   a lighting unit configured to emit light toward the open lower part of the housing;
   a camera unit configured to obtain a resin image of a two-component resin injected into a battery module when the battery module is located under the open lower part of the housing; and
   a determiner configured to determine whether the two-component resin injected into the battery module is normal on the basis of color information of the resin image obtained by the camera unit,
   wherein the color information is digitized by at least one method selected from the group consisting of an HSV model, an RGB model, and an L*a* b* model.

2. The automatic two-component resin inspection device of claim 1, further comprising a database unit storing color information according to a mixing ratio of the two-component resin.

3. The automatic two-component resin inspection device of claim 1, wherein the lighting unit comprises a plurality of light-emitting diodes (LEDs), and
   wherein the plurality of LEDs are uniformly located on opposite sides of an upper surface of the housing.

4. The automatic two-component resin inspection device of claim 1, wherein the camera unit comprises a machine vision camera, and
   wherein the determiner comprises an image processor included in the machine vision camera.

5. An automatic two-component resin inspection system comprising:
   a resin injection device configured to inject a two-component resin into a battery module; and
   an automatic two-component resin inspection device located downstream from the resin injection device, the automatic two-component resin inspection device being configured to:
      obtain a resin image of the two-component resin injected into the battery module; and
      determine whether the two-component resin injected into the battery module is normal on the basis of color information of the resin image,
   wherein the automatic two-component resin inspection device comprises:
      a housing having an open lower part;
      a lighting unit configured to emit light toward the open lower part of the housing;
      a camera unit configured to obtain the resin image of the two-component resin injected into the battery module when the battery module is located under the open lower part of the housing; and
      a determiner configured to determine whether the two-component resin injected into the battery module is normal on the basis of color information of the resin image obtained by the camera unit, and
   wherein the color information is digitized by at least one method selected from the group consisting of an HSV model, an RGB model, and an L*a* b* model.

6. The automatic two-component resin inspection system of claim 5, wherein the resin injection device comprises a pressure sensor configured to measure a pressure value in a valve during supply of a main resin and a curing agent of the two-component resin, and
   wherein the determiner is configured to determine that a mixed state of the two-component resin is normal when a result of determining whether the two-component resin is normal on the basis of the pressure value matches a result of determining whether the two-component resin is normal on the basis of the color information of the resin.

7. The automatic two-component resin inspection system of claim 5, wherein the resin injection device comprises a pressure sensor configured to measure a pressure value in a valve during supply of a main resin and a curing agent of the two-component resin, and
   wherein the determiner is configured to determine that at least one of the pressure sensor, the lighting unit, or the camera unit is abnormal and to generate alarm information when a result of determining whether the two-component resin is normal on the basis of the pressure value does not match a result of determining whether the two-component resin is normal on the basis of the color information of the resin.

8. An automatic two-component resin inspection using an automatic two-component resin inspection system according to claim 5, the method comprising:
   injecting a two-component resin prepared by mixing a main resin and a curing agent into a battery module by the resin injection device;
   obtaining a resin image of the two-component resin injected into the battery module by the camera unit; and
   determining, by the determiner, whether the two-component resin injected into the battery module is normal on the basis of color information of the resin image.

9. The automatic two-component resin inspection method of claim 8, further comprising, after the injecting of the two-component resin, measuring and obtaining a pressure value in a valve by a pressure sensor of the resin injection device during supply of the main resin and the curing agent.

10. The automatic two-component resin inspection method of claim 9, wherein the determining of whether the two-component resin injected into the battery module is normal comprises determining that a mixed state of the two-component resin is normal when a result of determining whether the two-component resin is normal on the basis of the pressure value matches a result of determining whether the two-component resin is normal on the basis of the color information of the resin.

11. The automatic two-component resin inspection method of claim 9, wherein the determining of whether the two-component resin injected into the battery module is normal comprises generating alarm information when a result of determining whether the two-component resin is normal on the basis of the pressure value does not match a result of determining whether the two-component resin is normal on the basis of the color information of the resin.

* * * * *